(12) United States Patent
Chen et al.

(10) Patent No.: US 12,470,086 B2
(45) Date of Patent: Nov. 11, 2025

(54) DUAL POWER SWITCHING SYSTEM AND METHOD OF OPERATING THE SAME

(71) Applicant: DELTA ELECTRONICS, INC., Taoyuan (TW)

(72) Inventors: Hsin-Chih Chen, Taoyuan (TW); Meng-Jiang Tsai, Taoyuan (TW); Chao-Li Kao, Taoyuan (TW); Yi-Ping Hsieh, Taoyuan (TW); Hung-Chieh Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/659,973

(22) Filed: May 9, 2024

(65) Prior Publication Data

US 2025/0266710 A1    Aug. 21, 2025

(30) Foreign Application Priority Data

Feb. 19, 2024    (CN) .......................... 202410181997.9

(51) Int. Cl.
   *H02J 9/06*    (2006.01)
(52) U.S. Cl.
   CPC .............. *H02J 9/068* (2020.01); *H02J 9/062* (2013.01)
(58) Field of Classification Search
   CPC ...... H02J 9/06; H02J 9/068; H02J 1/10; H02J 2207/50; H02J 7/02; H02J 7/345; H02J 9/061; H02J 9/062
   See application file for complete search history.

(56) References Cited

U.S. PATENT DOCUMENTS

| 5,808,378 A | 9/1998 | O'Leary |
| 6,272,573 B1 | 8/2001 | Coale et al. |

(Continued)

FOREIGN PATENT DOCUMENTS

| CN | 1918769 B | 9/2011 |
| CN | 102820699 A | 12/2012 |

(Continued)

OTHER PUBLICATIONS

Search Report dated Sep. 13, 2023 of the relating European patent application No. 23155226.6.

(Continued)

*Primary Examiner* — John W Poos
(74) *Attorney, Agent, or Firm* — MUNCY, GEISSLER, OLDS & LOWE, P.C.

(57) ABSTRACT

A dual power switching system selects a first power source or a second power source to supply power to a load coupled to an inductive device. The dual power switching system includes a first thyristor, a second thyristor, a third thyristor, a fourth thyristor, and a controller. The controller calculates a total magnetic flux according to a current magnetic flux of the inductive device and an expected magnetic flux of the second power source. When the power-supplying source is switched, the controller turns off the first thyristor and the second thyristor, and determines whether a commutable time is reached according to a power parameter of the first static transfer switch and the second static transfer switch. When the commutable time is reached, the controller correspondingly turns on at least one of the third thyristor and the fourth thyristor according to the total magnetic flux being less than a threshold.

19 Claims, 7 Drawing Sheets

(56) References Cited

U.S. PATENT DOCUMENTS

| | | | |
|---|---|---|---|
| 6,977,448 B2 | 12/2005 | Kanouda et al. | |
| 7,459,804 B2* | 12/2008 | Marwali | H02J 9/06 307/127 |
| 7,502,950 B1 | 3/2009 | Brands | |
| 9,520,874 B2 | 12/2016 | Bush et al. | |
| 11,476,699 B2* | 10/2022 | Peng | H02J 9/061 |
| 11,682,920 B1 | 6/2023 | Zhang et al. | |
| 2004/0054821 A1 | 3/2004 | Warren | |
| 2005/0184591 A1 | 8/2005 | Marwali et al. | |
| 2005/0184592 A1 | 8/2005 | Marwali et al. | |
| 2013/0106190 A1* | 5/2013 | Lin | H02J 9/061 307/64 |
| 2014/0132080 A1* | 5/2014 | Bush | H03K 17/94 307/130 |
| 2015/0302124 A1 | 10/2015 | Lee et al. | |
| 2017/0126006 A1 | 5/2017 | Pfitzer et al. | |
| 2020/0076228 A1* | 3/2020 | Peng | H02J 9/06 |
| 2021/0288518 A1 | 9/2021 | Budde et al. | |

FOREIGN PATENT DOCUMENTS

| | | |
|---|---|---|
| CN | 106329708 A | 1/2017 |
| CN | 103812308 B | 9/2017 |
| CN | 108432077 A | 8/2018 |
| CN | 109787347 A | 5/2019 |
| CN | 110008069 B | 4/2023 |
| JP | 2017055574 A | 3/2017 |
| TW | I828447 B | 1/2024 |
| WO | 2005078893 A1 | 8/2005 |

OTHER PUBLICATIONS

Search Report dated Oct. 10, 2023 of the relating PCT patent application No. PCT/CN2023/099543.

Zheng-hai Liu et al., "Design and R&D of Static Transfer Switch Controller", Masters Thesis, Jiangsu University of Science and Technology, Mar. 2013, 90 pages.

Office Action dated Dec. 6, 2024 of the corresponding Taiwan patent application No. 113105726.

Search Report dated Aug. 29, 2024 of the corresponding PCT patent application No. PCT/CN2024/077493.

* cited by examiner (A)

(B)

(C)

DUAL POWER SWITCHING SYSTEM AND METHOD OF OPERATING THE SAME

BACKGROUND

Technical Field

The present disclosure relates to a switching system and a method of operating the same, and more particularly to a dual power switching system and a method of operating the same.

Description of Related Art

The statements in this section merely provide background information related to the present disclosure and do not necessarily constitute prior art.

A static transfer switch (STS) device is an essential component in the data center power system configuration. It can provide uninterrupted power supply to loads such as critical equipment, and it usually contains multiple silicon-controlled rectifiers. STS devices are usually supplied power by multiple independent power sources and automatically switched from the preferred (primary) power source to the backup power source once the preferred (primary) power source exceeds the acceptable range. Therefore, it is to provide uninterruptible power to critical equipment to avoid power supply interruption to critical equipment causing forced shutdown of critical equipment.

Typically, the output of a static transfer switch (STS) device is connected to critical equipment through a transformer. Since the transformer is an inductive device, when the accumulated magnetic flux is too high, there will be a problem of magnetic flux saturation. Therefore, if the primary power source exceeds the acceptable range, and improper switching between the two power sources may cause high inrush currents in the downstream transformer. When the surge current is too high, it can overload the upstream circuit or trip the circuit breaker, causing the entire system to lose power. Therefore, the conventional power switching method is to wait for an appropriate time before turning on the silicon-controlled rectifier of the backup power source after the current flowing through the silicon-controlled rectifier of the primary power source drops to zero to avoid excessive surge current. However, this switching method requires waiting for the current to drop to zero and additional waiting for the appropriate time to switch. As a result, the waiting time is too long and the output voltage is too low, which may still lead to the risk of critical equipment being forced to shut down.

Therefore, how to design a dual power switching system and a method of operating the same to avoid improper switching of the dual power source has become a critical topic in this field.

SUMMARY

In order to solve the problems above, the present disclosure provides a dual power switching system. The dual power switching system selects a first power source or a second power source to supply power to a load coupled to an inductive device. The dual power switching system includes a first static transfer switch, a second static transfer switch, and a controller. The first static transfer switch is coupled to the first power source and the inductive device, and the first static transfer switch includes a first thyristor and a second thyristor connected in reverse parallel. The second static transfer switch is coupled to the second power source and the inductive device, and the second static transfer switch includes a third thyristor and a fourth thyristor. A forward-biased direction of the first thyristor is identical to a forward-biased direction of the fourth thyristor. The controller selectively controls the first thyristor, the second thyristor, the third thyristor, and the fourth thyristor according to the first power source or the second power source being as a power-supplying source. When the power-supplying source is switched from the first power source to the second power source, the controller turns off the first thyristor and the second thyristor, and determines whether a commutable time is reached according to a power parameter of the first static transfer switch and the second static transfer switch. The controller calculates a total magnetic flux according to a current magnetic flux of the inductive device and an expected magnetic flux of the second power source, and when the commutable time is reached, the controller correspondingly turns on at least one of the third thyristor and the fourth thyristor according to the total magnetic flux being less than a threshold.

In order to solve the problems above, the present disclosure provides a method of operating a dual power switching system. The dual power switching system includes a first static transfer switch and a second static transfer switch coupled to an inductive device. The first static transfer switch includes a first thyristor and a second thyristor connected in reverse parallel. The second static transfer switch includes a third thyristor and a fourth thyristor connected in reverse parallel. The method includes steps of: (a) respectively turning off the first thyristor and the second thyristor when a power-supplying source is switched from a first power source to a second power source, (b) calculating a total magnetic flux according to a current magnetic flux of the inductive device and an expected magnetic flux of the second power source, (c) determining whether a commutable time is reached according to a power parameter of the first static transfer switch and the second static transfer switch, when the commutable time is reached, executing steps of: (d1) determining whether the total magnetic flux is less than a threshold, and (d2) correspondingly turning on at least one of the third thyristor and the fourth thyristor when the total magnetic flux is less than the threshold.

The main purpose and effect of the present disclosure is to provide an operating method of a dual power switching system to operate the power switching of a dual power source. The method mainly uses four independent control signals to control the gate terminals respectively so that the first static transfer switch and the second static transfer switch independently turn on the corresponding thyristors during a certain period of commutation when confirming that the total magnetic flux does not exceed the threshold and to achieve the effects of shortening the switching time of power switching and reducing inrush current.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
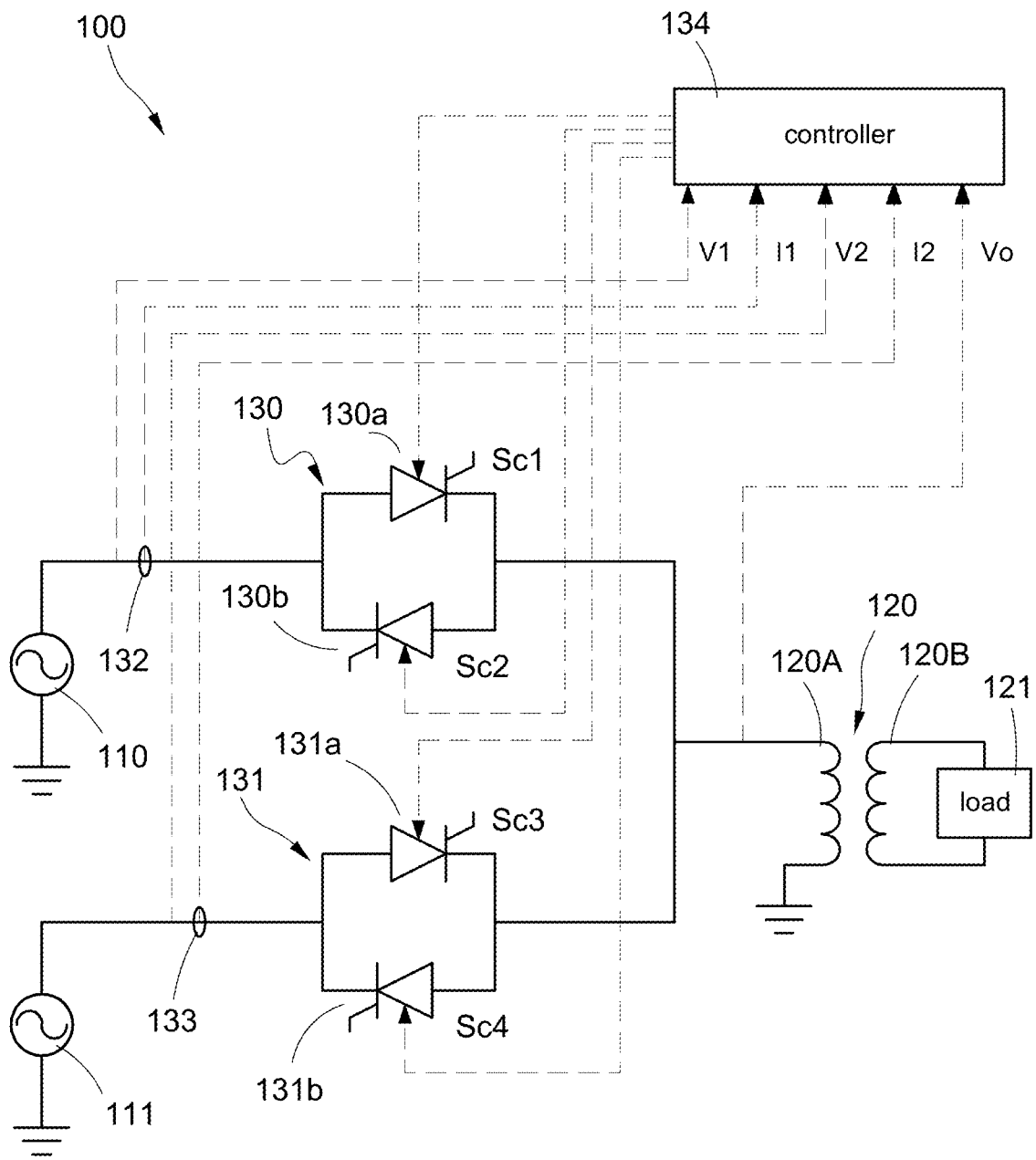
FIG. 1 is a block diagram of a dual power switching system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a dual power switching system according to the present disclosure. The dual power switching system 100 mainly supplies power to a load 121, and the dual power switching system 100 includes a static transfer switch device, an inductive device 120, and a controller 134. The static transfer switch device includes a first static transfer switch 130 and a second static transfer switch 131. The load 121 may preferably be, for example, but not limited to, a critical load that requires uninterrupted and continuous operation such as a server, communication system, etc., but is not limited to this. The first static transfer switch 130 is coupled to a first power source 110, and the second static transfer switch 131 is coupled to a second power source 111. The inductive device 120 includes a first side winding 120A and a second side winding 120B. The first side winding 120A is coupled to the first static transfer switch 130 and the second static transfer switch 131, and the second side winding 120B is coupled to the load 121. The controller 134 detects powers of the first power source 110 and the second power source 111, detects an output power received by the inductive device 120, and controls the first static transfer switch 130 and the second static transfer switch 131 accordingly. In particular, the controller 134 mainly selects the first power source 110 or the second power source 111 to supply power to the load 121 coupled to the inductive device 120. In one embodiment, the controller 134 may be a digital signal processor (DSP), but it is not limited to this, that is, all physical circuits that can use signals to control circuits, control devices having control software, etc. should be included in the scope of this embodiment.

Specifically, the dual power switching system 100 further includes a voltage sensor (not shown) and current sensors 132, 133. The voltage sensor and the current sensors 132, 133 are respectively coupled to the first power source 110 and the second power source 111 for detecting voltage signals V1, V2 and current signals I1, I2 corresponding to the first power source 110 and the second power source 111.

In addition, the voltage sensor is also coupled to the first side winding 120A or the second side winding 120B of the inductive device 120 for detecting a voltage signal Vo corresponding to the first side winding 120A or the second side winding 120B.

Figure 2:
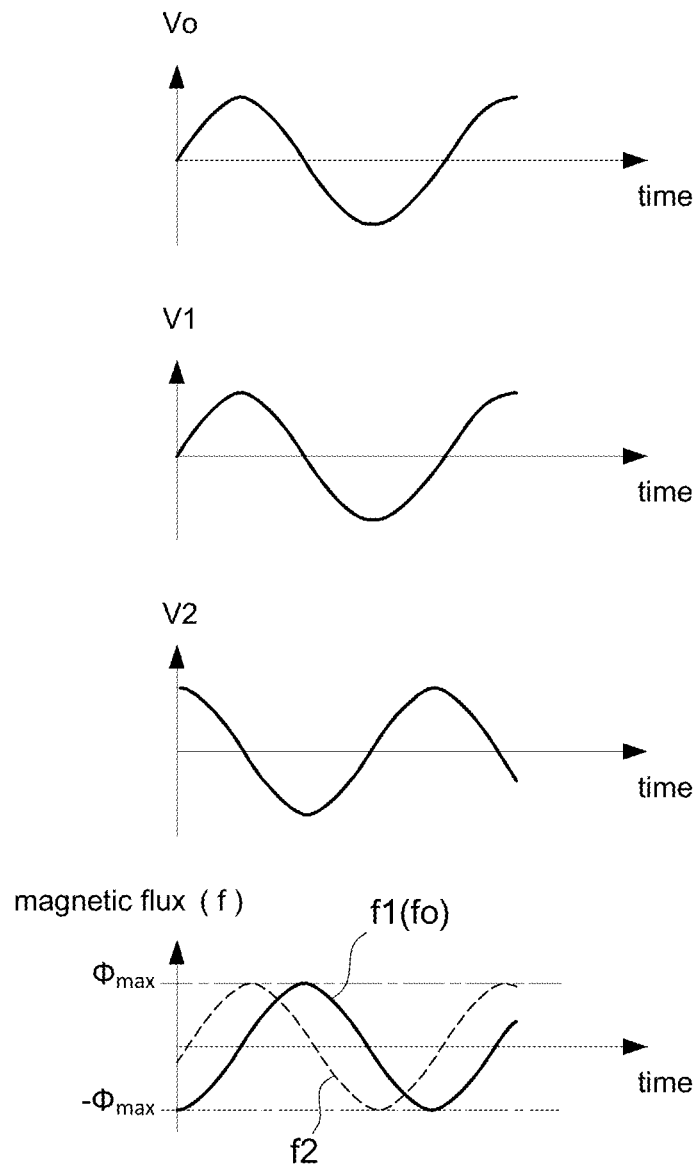
FIG. 2 is waveforms of a main power source, a backup power source, and an output power source according to the present disclosure.

Please refer to FIG. 2, which shows waveforms of a main power source, a backup power source, and an output power source according to the present disclosure. Although the voltage waveforms of the first power source 110 and the second power source 111 have a phase difference, this is only for illustration and they are not related to each other. That is, the switching control method of the present disclosure mainly controls the magnetic flux, regardless of the size of the phase difference. The controller 134 acquires the voltage signals V1, V2, Vo and integrates the voltage signals V1, V2, Vo to acquire the magnetic fluxes f1, f2 corresponding to the first power source 110 and the second power source 111, and the magnetic flux fo on the inductive device 120. In particular, the magnetic flux f1 is the integral of the voltage signal V1, the magnetic flux f2 is the integral of the voltage signal V2, and the magnetic flux fo is the integral of the voltage signal Vo. Since the first static transfer switch 130 is turned on so that the first power source 110 is connected to the inductive device 120, the magnetic flux f1 is consistent with the magnetic flux fo. In particular, since the integral of the voltage is the magnetic flux, and the integral of the sine wave is still a sine wave, that is, the magnetic fluxes f1, f2 and the expected magnetic flux fo are still sine waves.

Please refer to FIG. 1 again, each of the first static transfer switch 130 and the second static transfer switch 131 includes a plurality of silicon-controlled rectifiers (SCRs). The first thyristor 130a and the second thyristor 130b of the first static transfer switch 130 are connected in reverse parallel, and the third thyristor 131a and the fourth thyristor 131b of the second static transfer switch 131 are connected in reverse parallel. The above-mentioned thyristors 130a to 131b may preferably be silicon-controlled rectifiers, but are not limited thereto. In addition, an anode and a cathode of the first thyristor 130a and an anode and a cathode of the third thyristor 131a are arranged in the same direction, and an anode and a cathode of the second thyristor 130b and an anode and a cathode of the fourth thyristor 131b are arranged in the same direction. Therefore, a forward-biased direction of the first thyristor 130a is identical to a forward-biased direction of the fourth thyristor 131b, and a forward-biased direction of the second thyristor 130b is identical to a forward-biased direction of the third thyristor 131a.

Due to the characteristics of the thyristors 130a to 131b when current flows through the thyristors 130a to 131b, the controller 134 cannot turn off the thyristors 130a to 131b through the gate terminals. Therefore, the thyristors 130a to 131b will be turned off only after the thyristors 130a to 131b naturally freewheel to zero or use forced commutation technology to cancel the anode current. Accordingly, the main purpose and effect of the present disclosure is to provide an operation method of a dual power switching system to operate the power switching of the dual power source. The method mainly uses four independent control signals Sc1 to Sc4 to control the gate terminals respectively so that the first static transfer switch 130 and the second static transfer switch 131 independently turn on the corresponding thyristors 130a to 131b during a certain period of commutation when confirming that the total magnetic flux does not exceed the threshold and to achieve the effects of shortening the switching time of power switching and reducing inrush current. After disclosing the structural features of the present disclosure, the operation method will be further explained in the following paragraphs, which will not be described again here.

Specifically, the controller 134 selectively controls the first thyristor 130a, the second thyristor 130b, the third thyristor 131a, and the fourth thyristor 131b according to the first power source 110 or the second power source 111 being as a power-supplying source. In particular, the controller 134 can be used to continuously calculate and capture the magnetic fluxes f1, f2, fo in the first power source 110, the second power source 111, and the downstream inductive device 120 (such as, but not limited to, inductive components such as transformers) in real time. If a power failure event occurs (for example, but not limited to, an abnormality occurs in the first power source 110), the controller 134 provides control signals Sc1, Sc2 respectively to turn off the thyristors 130a, 130b on working paths of the first power source 110. Afterward, according to the magnetic fluxes calculated based on the detected voltages V1, V2, Vo and the specific operation mode, the control signals Sc3, Sc4 are respectively provided to turn on the thyristors 131a, 131b on the backup path (i.e., related to the second power source 111) so as to not only avoid improper switching between the two power sources, causing high inrush current in the downstream inductive device 120, but also avoid waiting for the freewheeling of the silicon-controlled rectifier to reach zero, causing the output power to drop too low, which is not sufficient to maintain the stable operation of the load 121. In particular, according to the specific operation mode designed in the present disclosure, the control signals Sc3, Sc4 can be provided in segments to respectively turn on the thyristors 131a, 131b (that is, only one of the thyristors 131a, 131b is turned on during a certain period of commutation).

Moreover, the controller 134 can detect a first current (i.e., the current signal I1) flowing through the first static transfer switch 130 by a first current sensor 132 to detect whether the first static transfer switch 130 is turned on or turned off. That is, the controller 134 can confirm whether the first static transfer switch 130 is correctly turned on and turned off through the first current (i.e., the current signal I1) to confirm whether the entire dual power switching system 100 normally operates. Moreover, the controller 134 can simply determine whether the thyristors 130a, 130b are correctly turned on and turned off by detecting voltages across two ends of the thyristors 130a, 130b (through the voltage signals V1, Vo). Similarly, the controller 134 can use the second current (i.e., the current signal I2) to confirm whether the second static transfer switch 131 is correctly turned on and turned off so as to confirm whether the entire dual power switching system 100 normally operates. Moreover, it can also be easily determined whether the thyristors 130a, 130b are correctly turned on and turned off by detecting the voltages across the two ends of the thyristors 131a, 131b (through the voltage signals V2, Vo).

In FIG. 2, $\Phi_{max}$ is the preset upper limit magnetic flux, and $-\Phi_{max}$ is the preset lower limit magnetic flux. The main feature in the present disclosure is that after the dual power source is switched, the magnetic flux fo of the downstream inductive device 120 is always limited to the range of the upper limit magnetic flux $\Phi_{max}$ and the lower limit magnetic flux $-\Phi_{max}$ so as to avoid the magnetic flux fo exceeding the range and causing the inductive device 120 to be saturated and causing excessive surge current. For convenience of explanation, the upper limit magnetic flux $\Phi_{max}$ and the lower limit magnetic flux $-\Phi_{max}$ are both represented by a threshold $\Phi_{thz}$. The present disclosure takes the example of switching the first power source 110 (that is, as the main power source) to the second power source 111 (that is, as the backup power source). Mainly, a current magnetic flux $\Phi_{LoadReal}$ of the inductive device 120 at a time point to be switched and an expected magnetic flux $\Phi_{future}$ of the second power source 111 are acquired. The current magnetic flux $\Phi_{LoadReal}$ and the expected magnetic flux $\Phi_{future}$ are calculated to determine the switching timing of the thyristors 131a, 131b. In particular, the calculation formula of the expected magnetic flux $\Phi_{future}$ is:

$$\phi_{future} = \phi_{max} - \phi_{111}, \text{ or} \quad \text{(formula 1)}$$

$$\phi_{future} = -\phi_{max} - \phi_{111}. \quad \text{(formula 2)}$$

According to the calculation of the above formula 1 and formula 2, how much expected magnetic flux will be added to the inductive device 120 can be acquired after the first power source 110 is switched to the second power source 111, that is, the two can be summed to a total magnetic flux Pall, and its calculation formula is:

$$\phi_{all} = \phi_{LoadReal} + \phi_{future}. \quad \text{(formula 3)}$$

Therefore, the total magnetic flux $\Phi_{all}$ after switching must be smaller than the threshold $\Phi_{thz}$ to avoid improper switching between the two power sources and causing high surge current in the downstream inductive device 120. Due to the characteristics of turning off the thyristors 130a to 131b mentioned above, in addition to considering that the total magnetic flux $\Phi_{all}$ must be less than the threshold $\Phi_{thz}$, it is also necessary to consider whether when the second static transfer switch 131 is turned on, a reverse bias voltage can be provided to forcibly turn off the first static transfer switch 130, thereby achieving functions of forced commutation to speed up the switching of the dual power source.

Figure 3:
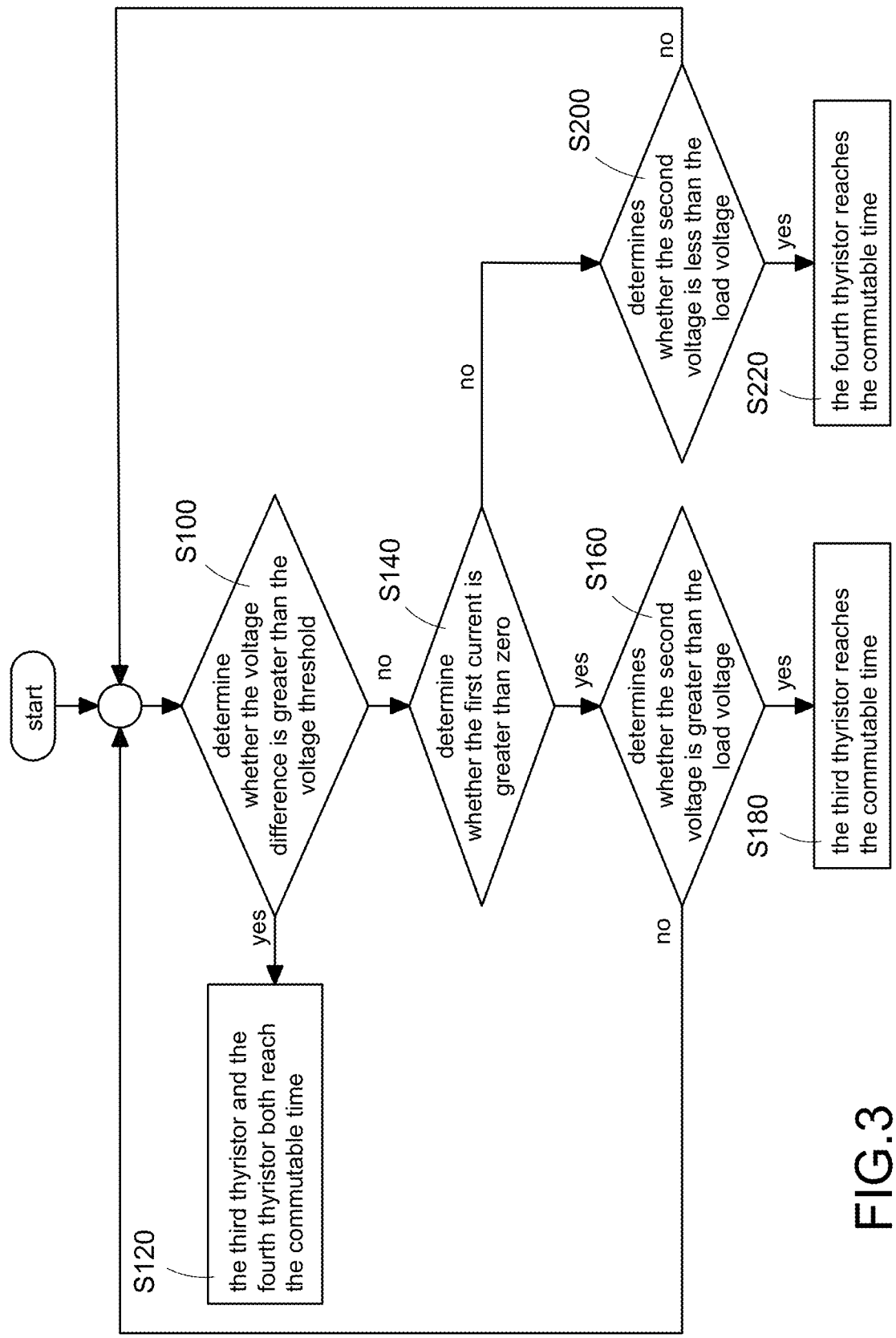
FIG. 3 is a flowchart of determining a commutable time of the dual power switching system according to the present disclosure.

Please refer to FIG. 3, which shows a flowchart of determining a commutable time of the dual power switching system according to the present disclosure, also refer to FIG. 1 and FIG. 2. The process in FIG. 3 is mainly to determine whether a commutable time has been reached, and mainly takes the switching of the first power source 110 (that is, as the main power source) to the second power source 111 (that is, as the backup power source) as an example. When the commutable time is reached, if the corresponding thyristors 131a to 131b are turned on, a reverse bias voltage can be provided to forcibly turn off the first static transfer switch 130. Therefore, when the power-supplying source is to be switched from the first power source 110 to the second power source 111, the controller 134 provides control signals Sc1, Sc2 respectively to control the first thyristor 130a and the second thyristor 130b to turn off. In this condition, it may happen that one of the two switches cannot be smoothly turned off or both can be smoothly turned off. Therefore, the controller 134 can determine which one of the first static transfer switch 130 and the second static transfer switch 131 is not turned off, or both are turned off by detecting the power parameters of the first static transfer switch 130 and the second static transfer switch 131. Moreover, the power parameters are also used to determine whether the thyristors 130a, 130b that are not turned off have reached the commutable time. In particular, the power parameters may be voltage signals V1, V2, Vo or current signals I1, I2.

Taking FIG. 3 as an example, when the controller 134 provides control signals Sc1, Sc2 respectively to control the first thyristor 130a and the second thyristor 130b to turn off, the controller 134 determines whether the voltage difference between the first voltage of the first power source 110 (corresponding to the voltage signal V1) and the load voltage of the inductive device 120 (corresponding to the voltage signal Vo) is greater than a voltage threshold (step S100). When the controller 134 determines that the voltage difference is greater than the voltage threshold, the two thyristors 130a, 130b representing the first static transfer switch 130 are both turned off, and a difference occurs between the power received by the first power source 110 and the inductive device 120. Therefore, the controller 134 determines that both the third thyristor 131a and the fourth thyristor 131b reach the commutable time (step S120).

On the contrary, when the determination result of the step S100 is "No", it means that one of the thyristors 130a, 130b of the first static transfer switch 130 has not been turned off. Therefore, the controller 134 determines whether the first current (corresponding to the current signal I1) is greater than zero (step S140). When the first current (corresponding to the current signal I1) is greater than zero, it means that the first thyristor 130a is not turned off, so the step S160 is executed to determine whether the second voltage (corresponding to the voltage signal V2) is greater than the load voltage (corresponding to the voltage signal Vo) of the inductive device 120. When the controller 134 determines that the second voltage (corresponding to the voltage signal V2) is greater than the load voltage (corresponding to the voltage signal Vo) of the inductive device 120, it means that the third thyristor 131a is turned on for a specific period of time to provide a reverse bias voltage to forcibly turn off the first thyristor 130a. Therefore, the controller 134 determines that the third thyristor 131a reaches the commutable time (step S180). On the contrary, when the determination result of the step S160 is "No", return to the step S100 for continuous detection and determination.

When the determination result of the step S140 is "No", it means that the second thyristor 130b is not turned off, so the step S200 is executed to determine whether the second voltage (corresponding to the voltage signal V2) is less than the load voltage (corresponding to the voltage signal Vo) of the inductive device 120. When the controller 134 determines that the second voltage (corresponding to the voltage signal V2) is less than the load voltage (corresponding to the voltage signal Vo) of the inductive device 120, it means that the fourth thyristor 131b is turned on for a specific period of time to provide a reverse bias voltage to forcibly turn off the second thyristor 130b, thereby achieving functions of forced commutation to speed up the switching of the dual power source. Therefore, the controller 134 determines that the fourth thyristor 131b reaches the commutable time (step S220). On the contrary, when the determination result of the step S200 is "No", return to the step S100 for continuous detection and determination. In one embodiment, the process of FIG. 3 may be applied to the circuit structure of FIG. 1, but is not limited thereto, and any multi power switching system that can force commutation by providing reverse bias voltage should be included in the scope of this embodiment.

When the commutable time is reached, the controller 134 can calculate the total magnetic flux $\Phi_{all}$ according to the current magnetic flux $\Phi_{LoadReal}$ of the inductive device 120 and the expected magnetic flux $\Phi_{future}$ of the second power source 111. When the commutable time is reached, the controller 134 determines whether the total magnetic flux Pall is less than the threshold $\Phi_{thz}$, and at least one of the third thyristor 131a and the fourth thyristor 131b is correspondingly turned on according to the total magnetic flux Pall being less than the threshold $\Phi_{thz}$. That is, the controller 134 can turn on only the third thyristor 131a, only the fourth thyristor 131b, or both the third thyristor 131a and the fourth thyristor 131b. The switching timing of each thyristor will be further explained later and will not be repeated here.

Figure 4:
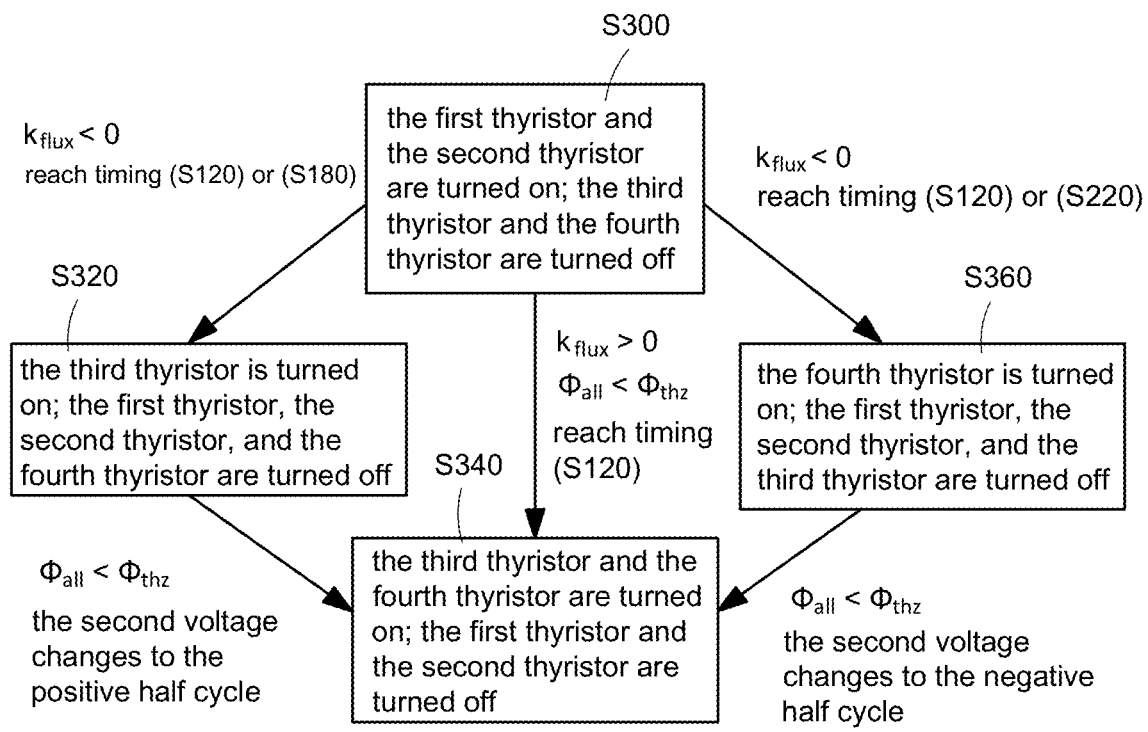
FIG. 4 is a flowchart of a switching timing of the dual power switching system according to the present disclosure.

Please refer to FIG. 4, which shows a flowchart of a switching timing of the dual power switching system according to the present disclosure, and also refer to FIG. 1 to FIG. 3. After the commutable time is reached, the controller 134 needs to determine the switching timing of each thyristor to avoid switching between thyristors, the total magnetic flux Pall of the inductive device 120 exceeds the threshold $\Phi_{thz}$, resulting in a high inrush current situation. Therefore, the controller 134 can calculate a polarity $k_{flux}$ according to the current magnetic flux $\Phi_{LoadReal}$ and the expected magnetic flux $\Phi_{future}$, and the calculation formula is:

$$k_{flux} = \operatorname{sgn}(\phi_{LoadReal} \cdot \phi_{future}). \qquad \text{(formula 4)}$$

In which, sgn is a sign function, which is used to determine the sign of real numbers. Therefore, when the positive and negative of the two magnetic fluxes (i.e., the current magnetic flux $\Phi_{LoadReal}$ and the expected magnetic flux $\Phi_{future}$) are the same, the polarity $k_{flux}$ is positive, and vice versa. Since the magnetic flux calculation and switching operation of the dual power switching system are based on half cycles, if the current magnetic flux $\Phi_{LoadReal}$ is positive and the future expected magnetic flux $\Phi_{future}$ is negative, the accumulated total magnetic flux $\Phi_{all}$ must be less than the threshold $\Phi_{thz}$. On the contrary, the same is true when the current magnetic flux $\Phi_{LoadReal}$ is negative. Therefore, during this period, the reverse bias voltage can be provided to forcibly turn off the thyristor that has not been turned off to achieve the forced commutation function. Therefore, in the step S300 of FIG. 4, the first power source 110 supplies power to the load 121, and the first thyristor 130a and the second thyristor 130b are electrically connected. Afterward, in the step S300, the controller 134 wants to switch the power-supplying source from the first power source 110 to the second power source 111, so the controller 134 provides control signals Sc1, Sc2 to respectively turn off the first thyristor 130a and the second thyristor 130b.

Therefore, the determination result of one of the step S120, the step S180, and the step S220 in FIG. 3 can be acquired. Afterward, when the determination result of executing the step S120 or the step S180, a step S320 in FIG. 4 can be executed at an appropriate opportunity. Therefore, the controller 134 can determine whether the polarity $k_{flux}$ is reversed and whether the second voltage (corresponding to the voltage signal V2) is greater than zero according to the calculation result. When the polarity $k_{flux}$ is reversed and the second voltage (corresponding to the voltage signal V2) is greater than zero, the controller 134 provides the control signal Sc3 to the third thyristor 131a to forcibly turn off the first thyristor 130a by turning on the third thyristor 131a. In this condition, the controller 134 has not yet provided the control signal Sc4 to turn on the fourth thyristor 131b.

In the step S320, the first thyristor 130a is forced to be turned off by turning on the third thyristor 131a, and the second thyristor 130b has been successfully turned off when the controller 134 provides the control signal Sc2. Therefore, the remaining fourth thyristor 131b is not yet turned on.

However, in order to turn on the fourth thyristor 131b, it is necessary to consider whether the total magnetic flux $\Phi_{all}$ can be less than the threshold $\Phi_{thz}$ after the fourth thyristor 131b is turned on so as to avoid the inductive device 120 from generating excessive surge current. Therefore, in the step S320, it is still necessary to wait for the appropriate opportunity to turn on the fourth thyristor 131b and then executes the step S340 in which the third thyristor 131a and the fourth thyristor 131b are turned on. That is, in the step S320, the controller 134 determines whether the total magnetic flux $\Phi_{all}$ is less than the threshold $\Phi_{thz}$, and whether the second voltage (corresponding to the voltage signal V2) is less than zero. When the total magnetic flux $\Phi_{all}$ is less than the threshold $\Phi_{thz}$, and the second voltage (corresponding to the voltage signal V2) is less than zero, it means that turning on the fourth thyristor 131b can make the total magnetic flux Pall less than the threshold $\Phi_{thz}$. Therefore, the controller 134 can independently turn on the third thyristor 131a and the fourth thyristor 131b. Also, after the controller 134 turns on the third thyristor 131a, the controller 134 can turn on the fourth thyristor 131b according to the second voltage (corresponding to the voltage signal V2) being less than zero and the total magnetic flux Pall being less than the threshold @thz so as to avoid the inductive device 120 from generating excessive surge current.

On the other hand, the determination and operation mechanism from the step S300 to the step S360 are similar to the determination and operation mechanism from the step S300 to the step S320. The only difference is that the fourth thyratron 131b is first turned on, and the rest of the contents are similar and will not be described again here. Similarly, the determination and operation mechanism from the step S360 to the step S340 are similar to the determination and operation mechanism from the step S320 to the step S340. The difference is only that the third thyristor 131a is finally turned on, and the rest of the contents are similar and will not be described again here.

On the other hand, if specific conditions are met in the step S300, the step S340 can be executed to complete the switching of dual power source. Specifically, when the determination result of executing the step S120, it means that after the controller 134 provides the control signals Sc1, Sc2 to the first thyristor 130a and the second thyristor 130b, the first thyratron 130a and the second thyristor 130b have been successfully turned off. Under this condition, the controller 134 can determine whether the total magnetic flux Pall is less than the threshold $\Phi_{thz}$, and whether the polarity $k_{flux}$ is the same. When the controller 134 determines that the total magnetic flux Pall is less than the threshold $\Phi_{thz}$ and the polarity $k_{flux}$ is the same, the controller 134 can simultaneously provide control signals Sc3, Sc4 to the third thyristor 131a and the fourth thyristor 131b to complete the switching of the dual power source so as to avoid the inductive device 120 from generating excessive surge current. In one embodiment, the process of FIG. 4 may be applied to the circuit structure of FIG. 1, but is not limited thereto, and any multi power switching system that can force commutation by providing reverse bias voltage should be included in the scope of this embodiment.

Figure 5A:
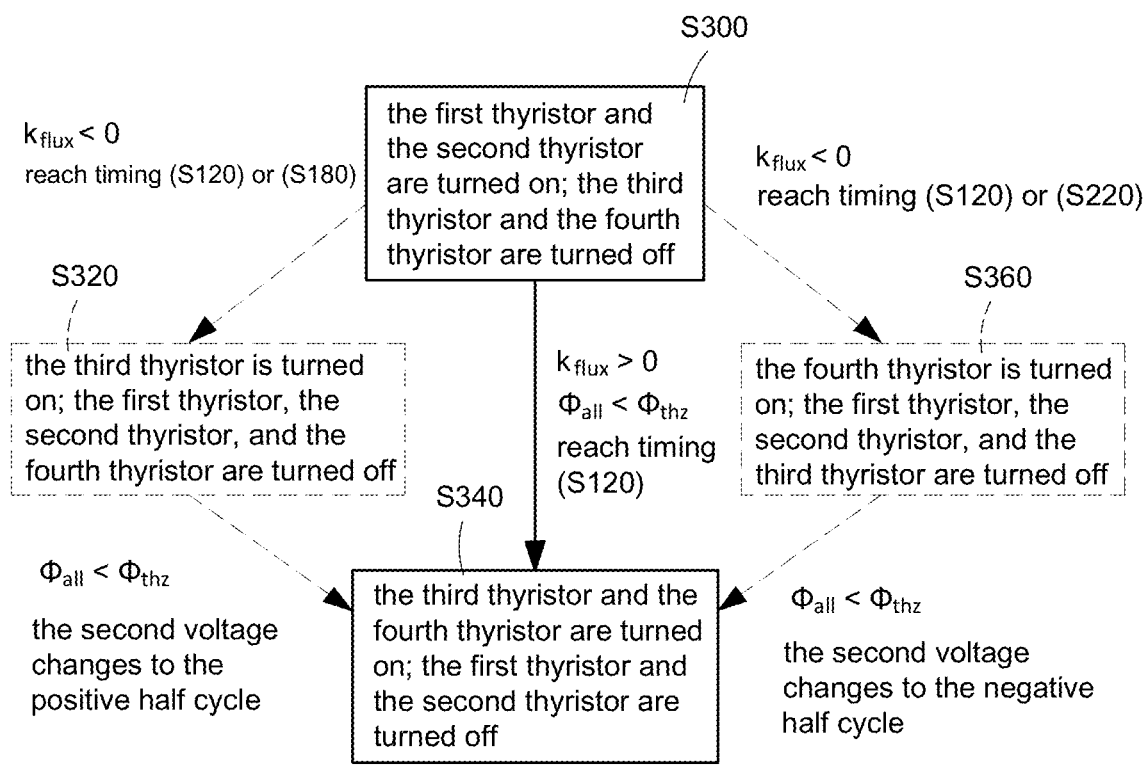
FIG. 5A is a flowchart of a switching timing of the dual power switching system according to a first embodiment of the present disclosure.
Figure 5B:
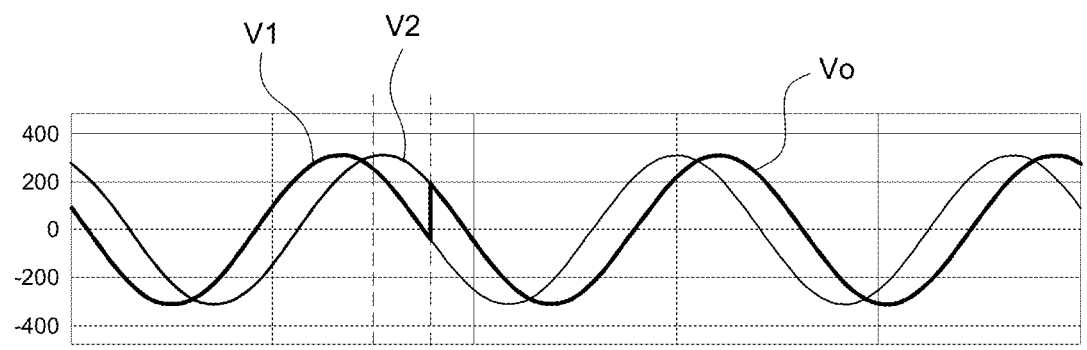
FIG. 5B is a schematic waveform diagram of the dual power switching system according to the first embodiment of the present disclosure.
Figure 5B:
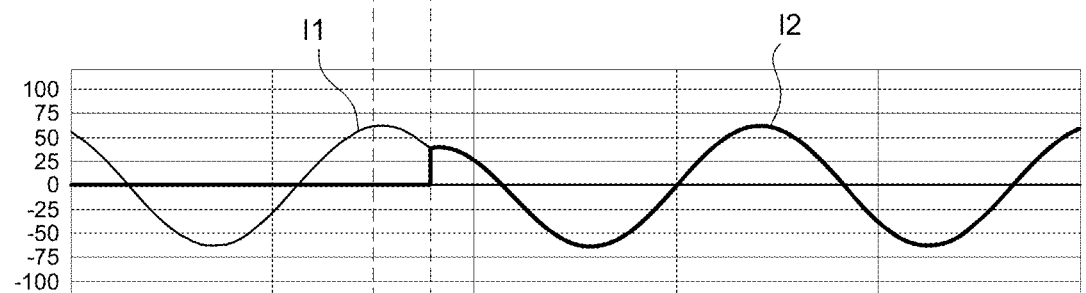
Figure 5B:
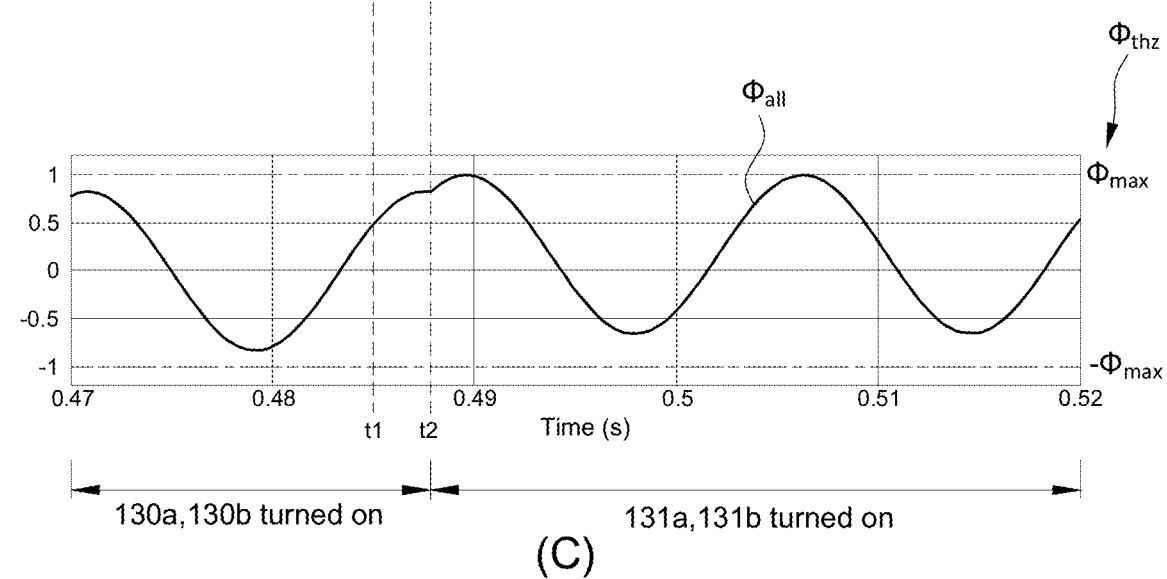

Please refer to FIG. 5A, which shows a flowchart of a switching timing of the dual power switching system according to a first embodiment of the present disclosure; please refer to FIG. 5B, which shows a schematic waveform diagram of the dual power switching system according to the first embodiment of the present disclosure, and also refer to FIG. 1 to FIG. 4. In FIG. 5A, the switching timing from the step S300 to the step S340 in FIG. 4 is shown, and FIG. 5B is a corresponding waveform diagram. In FIG. 5B, a waveform (A) includes the first voltage (corresponding to the voltage signal V1) of the first power source 110, the second voltage (corresponding to the voltage signal V2) of the second power source 111, and the load voltage (corresponding to the voltage signal Vo) of the inductive device 120. The waveform (B) includes a first current (corresponding to the current signal I1) of the first power source 110 and a second current (corresponding to the current signal I2) of the second power source 111, and the waveform (C) includes the total magnetic flux $\Phi_{all}$ of the inductive device 120.

At time t1, the controller 134 determines that both the third thyristor 131a and the fourth thyristor 131b reach the commutable time (step S120 in FIG. 3). However, the controller 134 determines that switching at this time will result in the total magnetic flux $\Phi_{all}$ not being less than the threshold $\Phi_{thz}$, and therefore the controller 134 waits without switching between the third thyristor 131a and the fourth thyristor 131b. When time t2 is reached, the controller 134 determines that the total magnetic flux Pall is less than the threshold $\Phi_{thz}$, and therefore the controller 134 provides control signals Sc3, Sc4 to turn on the third thyristor 131a and the fourth thyristor 131b. Therefore, the power-supplying source is switched from the first power source 110 to the second power source 111 to complete the power switching operation (step S340 in FIG. 4). Since the load 121 is supplied power by the first power source 110 before time t2, the voltage waveform Vo is the same as the voltage waveform V1. After time t2, the load 121 is supplied power by the second power source 111, and therefore the voltage waveform Vo is the same as the voltage waveform V2.

Figure 6A:
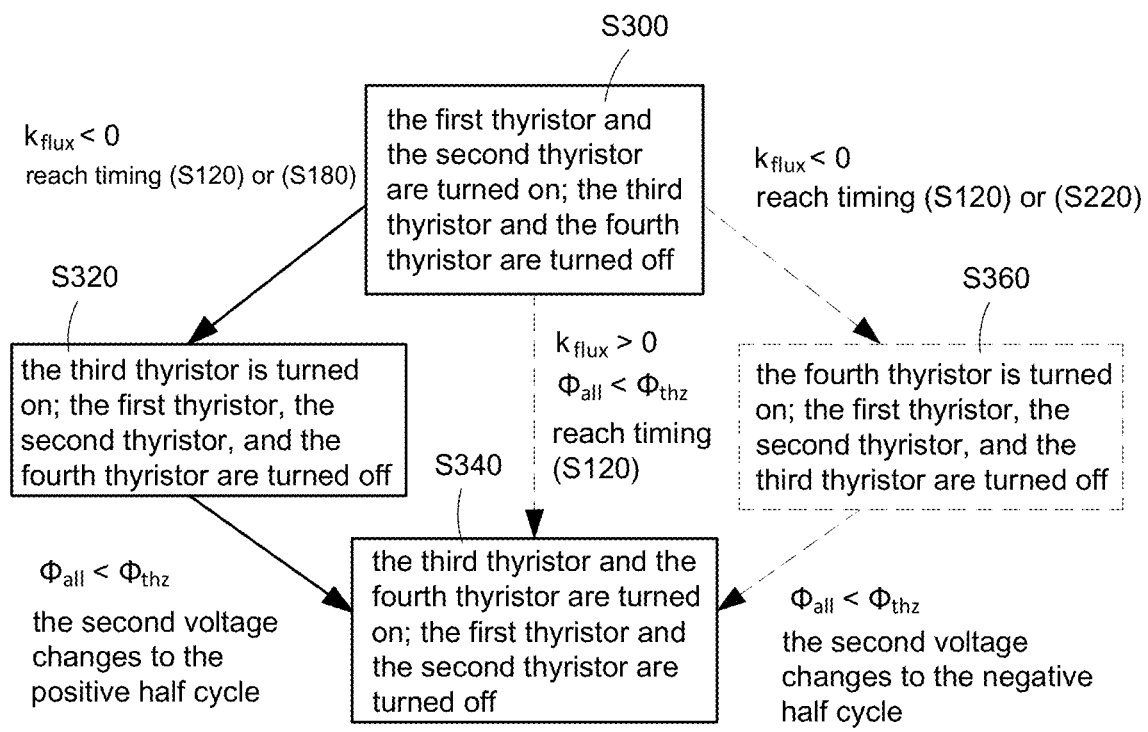
FIG. 6A is a flowchart of a switching timing of the dual power switching system according to a second embodiment of the present disclosure.
Figure 6B:
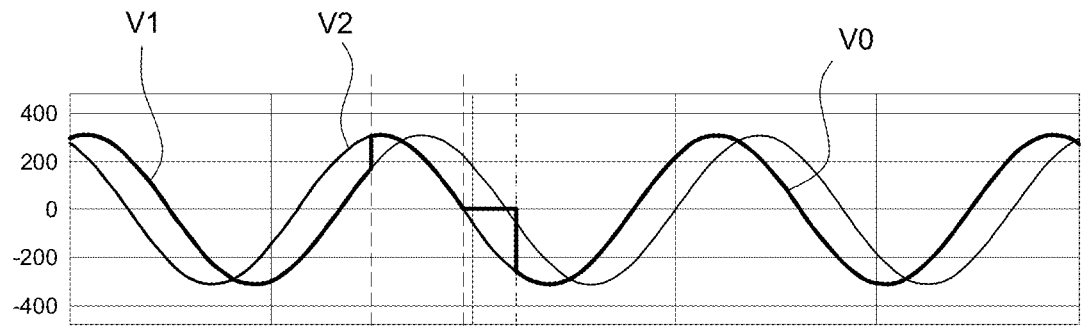
FIG. 6B is a schematic waveform diagram of the dual power switching system according to the second embodiment of the present disclosure.
Figure 6B:
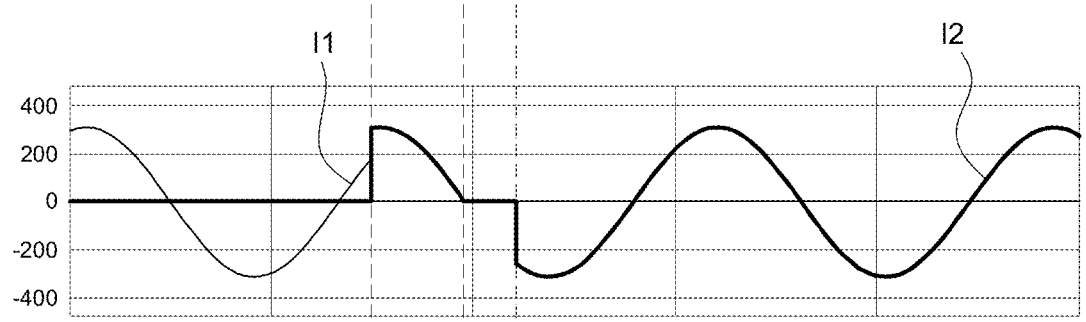
Figure 6B:
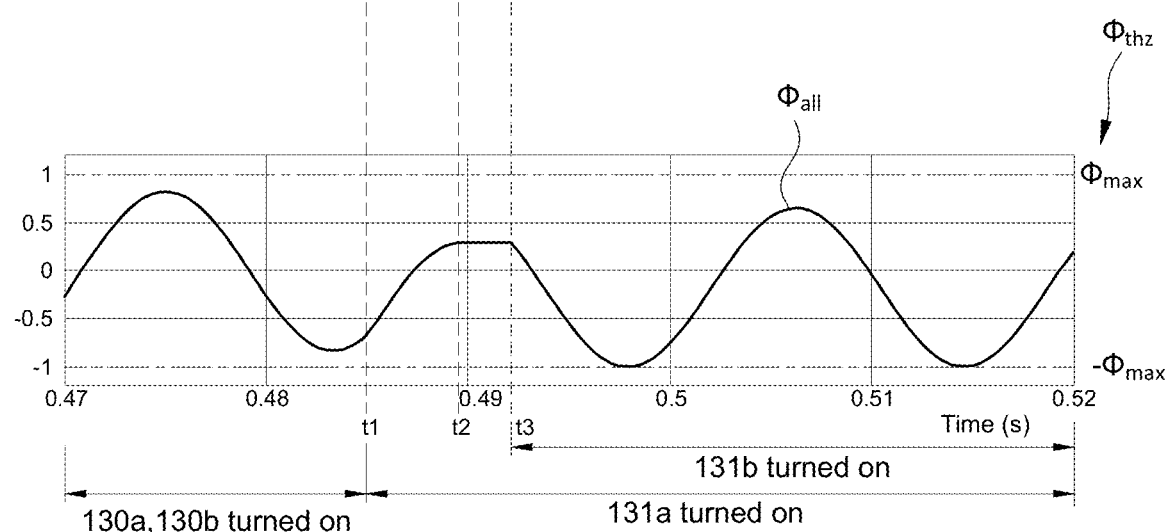

Please refer to FIG. 6A, which shows a flowchart of a switching timing of the dual power switching system according to a second embodiment of the present disclosure; please refer to FIG. 6B, which a schematic waveform diagram of the dual power switching system according to the second embodiment of the present disclosure, and also refer to FIG. 1 to FIG. 5B. In FIG. 6A, the waveform (A) to the waveform (C) are the same as those in FIG. 5A and will not be described again. At time t1, the controller 134 determines that the polarity $k_{flux}$ is reversed and the third thyristor 131a reaches the commutable time (step S180 in FIG. 3). Therefore, the controller 134 first provides the control signal Sc3 to turn on the third thyristor 131a so as to forcibly to turn off the first thyristor 130a by turning on the third thyristor 131a (step S320 in FIG. 4). In this condition, the voltage waveform Vo switches from the voltage waveform V1 to the voltage waveform V2. Afterward, when time t2 is reached, the second voltage (corresponding to the voltage signal V2) is less than zero. Although the controller 134 can naturally switch to turn on the fourth thyristor 131b, the controller 134 determines that if the fourth thyristor 131b is simultaneously turned on, the total magnetic flux Pall will be greater than the threshold $\Phi_{thz}$. Therefore, the controller 134 continues to wait and does not turn on the fourth thyristor 131b. When time t3 is reached, the controller 134 determines that after the fourth thyristor 131b is turned on, the total magnetic flux Pall will be less than the threshold $\Phi_{thz}$. Accordingly, at time t3, the controller 134 turns on the fourth thyristor 131b to complete the power switching operation (step S340 in FIG. 4).

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A dual power switching system configured to select a first power source or a second power source to supply power to a load coupled to an inductive device, the dual power switching system comprising:
 a first static transfer switch coupled to the first power source and the inductive device, and the first static transfer switch comprising a first thyristor and a second thyristor connected in reverse parallel,
 a second static transfer switch coupled to the second power source and the inductive device, and the second static transfer switch comprising a third thyristor and a fourth thyristor, wherein a forward-biased direction of the first thyristor is identical to a forward-biased direction of the fourth thyristor, and
 a controller configured to selectively control the first thyristor, the second thyristor, the third thyristor, and the fourth thyristor according to the first power source or the second power source being as a power-supplying source,
 wherein when the power-supplying source is switched from the first power source to the second power source, the controller is configured to turn off the first thyristor and the second thyristor, and determine whether a commutable time is reached according to a power parameter of the first static transfer switch and the second static transfer switch,
 wherein the controller is configured to calculate a total magnetic flux according to a current magnetic flux of the inductive device and an expected magnetic flux of the second power source, and when the commutable time is reached, the controller is configured to correspondingly turn on at least one of the third thyristor and the fourth thyristor according to the total magnetic flux being less than a threshold.

2. The dual power switching system as claimed in claim 1, wherein the power parameter comprises a voltage difference; when the controller determines that the voltage difference between a first voltage of the first power source and a load voltage of the inductive device is greater than a voltage threshold, the controller determines that the third thyristor and the fourth thyristor reach the commutable time.

3. The dual power switching system as claimed in claim 1, wherein the power parameter comprises a first current of the first power source and a second voltage of the second power source; when the controller determines that the first current is greater than zero and the second voltage is greater than a load voltage of the inductive device, the controller determines that the third thyristor reaches the commutable time.

4. The dual power switching system as claimed in claim 1, wherein the power parameter comprises a first current of the first power source and a second voltage of the second power source; when the controller determines that the first current is less than zero and the second voltage is less than a load voltage of the inductive device, the controller determines that the fourth thyristor reaches the commutable time.

5. The dual power switching system as claimed in claim 1, wherein the controller calculates a polarity according to the current magnetic flux and the expected magnetic flux; when the commutable time is reached, the controller turns on the third thyristor to forcibly turn off the first thyristor according to the polarity being reversed and a second voltage of the second power source being greater than zero.

6. The dual power switching system as claimed in claim 5, wherein the controller independently turns on the third thyristor and the fourth thyristor; after the controller turns on the third thyristor, the controller turns on the fourth thyristor according to the second voltage being less than zero and the total magnetic flux being less than the threshold.

7. The dual power switching system as claimed in claim 1, wherein the controller calculates a polarity according to the current magnetic flux and the expected magnetic flux; when the commutable time is reached, the controller turns on the fourth thyristor to forcibly turn off the second thyristor according to the polarity being reversed and a second voltage of the second power source being less than zero.

8. The dual power switching system as claimed in claim 7, wherein the controller independently turns on the third thyristor and the fourth thyristor; after the controller turns on the fourth thyristor, the controller turns on the third thyristor according to the second voltage being greater than zero and the total magnetic flux being less than the threshold.

9. The dual power switching system as claimed in claim 1, wherein controller calculates a polarity according to the current magnetic flux and the expected magnetic flux; when the commutable time is reached, the controller turns on the third thyristor and the fourth thyristor according to the polarity being the same and the total magnetic flux being less than the threshold.

10. A method of operating a dual power switching system, the dual power switching system comprising a first static transfer switch and a second static transfer switch coupled to an inductive device, the first static transfer switch comprising a first thyristor and a second thyristor connected in reverse parallel, the second static transfer switch comprising a third thyristor and a fourth thyristor connected in reverse parallel, the method comprising steps of:
 (a) respectively turning off the first thyristor and the second thyristor when a power-supplying source is switched from a first power source to a second power source,
 (b) calculating a total magnetic flux according to a current magnetic flux of the inductive device and an expected magnetic flux of the second power source,
 (c) determining whether a commutable time is reached according to a power parameter of the first static transfer switch and the second static transfer switch,
 when the commutable time is reached, executing steps of:
 (d1) determining whether the total magnetic flux is less than a threshold, and
 (d2) correspondingly turning on at least one of the third thyristor and the fourth thyristor when the total magnetic flux is less than the threshold.

11. The method of operating the dual power switching system as claimed in claim 10, wherein the power parameter comprises a voltage difference, and the step (c) further comprises steps of:
 (c11) determining whether the voltage difference between a first voltage of the first power source and a load voltage of the inductive device is greater than a voltage threshold, and
 (c12) determining that the third thyristor and the fourth thyristor reach the commutable time according to the voltage difference being greater than the voltage threshold.

12. The method of operating the dual power switching system as claimed in claim 10, wherein the power parameter comprises a first current of the first power source and a second voltage of the second power source, and the step (c) further comprises steps of:
- (c21) determining whether the first current is greater than zero, and whether the second voltage is greater than a load voltage of the inductive device, and
- (c22) determining that the third thyristor reaches the commutable time according to the first current being greater than zero and the second voltage being greater than the load voltage.

13. The method of operating the dual power switching system as claimed in claim 10, wherein the power parameter comprises a first current of the first power source and a second voltage of the second power source, and the step (c) further comprises steps of:
- (c31) determining whether the first current is less than zero, and whether the second voltage is less than a load voltage of the inductive device, and
- (c32) determining that the fourth thyristor reaches the commutable time according to the first current being less than zero and the second voltage being less than the load voltage.

14. The method of operating the dual power switching system as claimed in claim 10, wherein the step (b) further comprises a step of:
- (b1) calculating a polarity according to the current magnetic flux and the expected magnetic flux.

15. The method of operating the dual power switching system as claimed in claim 14, wherein when the commutable time is reached, further executing steps of:
- (e1) determining whether the polarity is reversed, and whether a second voltage of the second power source is greater than zero, and
- (e2) turning on the third thyristor to forcibly turn off the first thyristor when the polarity is reversed and the second voltage is greater than zero.

16. The method of operating the dual power switching system as claimed in claim 15, wherein after the step (e2), further comprising steps of:
- (e3) executing the step (d1), and determining whether the second voltage is less than zero, and
- (e4) turning on the fourth thyristor when the total magnetic flux is less than the threshold in the step (d1) and the second voltage is less than zero.

17. The method of operating the dual power switching system as claimed in claim 14, wherein when the commutable time is reached, further executing steps of:
- (f1) determining whether the polarity is reversed, and whether a second voltage of the second power source is less than zero, and
- (f2) turning on the fourth thyristor to forcibly turn off the second thyristor when the polarity is reversed and the second voltage is less than zero.

18. The method of operating the dual power switching system as claimed in claim 17, wherein after the step (f2), further comprising steps of:
- (f3) executing the step (d1), and determining whether the second voltage is greater than zero, and
- (f4) turning on the third thyristor when the total magnetic flux is less than the threshold in the step (d1) and the second voltage is greater than zero.

19. The method of operating the dual power switching system as claimed in claim 14, wherein when the commutable time is reached, further executing steps of:
- (g1) executing the step (d1), and determining whether the polarity is the same, and
- (g2) turning on the third thyristor and the fourth thyristor when the total magnetic flux is less than the threshold in the step (d1) and the polarity is the same.

* * * * *